US009699596B2

United States Patent
Hu et al.

(10) Patent No.: US 9,699,596 B2
(45) Date of Patent: Jul. 4, 2017

(54) METHOD FOR ACHIEVING SHORT-DISTANCE UNLOCKING ACCORDING TO THE ELECTROCARDIOGRAM AND SYSTEM THEREOF

(71) Applicant: Huizhou TCL Mobile Communication Co., Ltd., Huizhou, Guangdong (CN)

(72) Inventors: Binghui Hu, Guangdong (CN); Jie Zhang, Guangdong (CN)

(73) Assignee: Huizhou TCL Mobile Communication Co., Ltd., Huizhou, Guangdong (CN)

(*) Notice: Subject to any disclaimer, the term of this patent is extended or adjusted under 35 U.S.C. 154(b) by 0 days.

(21) Appl. No.: 14/786,516

(22) PCT Filed: May 30, 2014

(86) PCT No.: PCT/CN2014/078868
§ 371 (c)(1),
(2) Date: Oct. 22, 2015

(87) PCT Pub. No.: WO2015/158030
PCT Pub. Date: Oct. 22, 2015

(65) Prior Publication Data
US 2016/0044445 A1    Feb. 11, 2016

(30) Foreign Application Priority Data
Apr. 14, 2014    (CN) .......................... 2014 1 0147353

(51) Int. Cl.
*H04B 5/00*    (2006.01)
*G06F 21/32*    (2013.01)
(Continued)

(52) U.S. Cl.
CPC .............. *H04W 4/008* (2013.01); *H04B 5/00* (2013.01); *H04W 76/023* (2013.01); *H04W 8/005* (2013.01); *H04W 84/20* (2013.01)

(58) Field of Classification Search
CPC ........ H04W 4/008; H04B 5/00; H04B 5/0031
See application file for complete search history.

(56) References Cited

U.S. PATENT DOCUMENTS

| 8,478,196 B1 | 7/2013 | Hewinson |
| 2002/0012329 A1* | 1/2002 | Atkinson .............. G06F 9/4411 370/330 |

(Continued)

FOREIGN PATENT DOCUMENTS

| CN | 201828919 U | 5/2011 |
| CN | 102231213 A | 11/2011 |

(Continued)

*Primary Examiner* — Cindy Trandai
(74) *Attorney, Agent, or Firm* — Andrew C. Cheng

(57) ABSTRACT

A method for achieving short-distance unlocking according to the electrocardiogram and a system thereof are disclosed. The method comprises the following steps of: A. when a paired controlled device is found by a wearable device, determining by the wearable device whether the controlled device and the wearable device are in a short-distance state or a long-distance state therebetween; B. if the controlled device and the wearable device are in the short-distance state therebetween, then activating the short-distance communication by the wearable device to obtain the user's electrocardiogram and to wirelessly transmit the electrocardiogram to the paired controlled device; and C. determining by the paired controlled device whether the received electrocardiogram matches a template electrocardiogram stored in the paired controlled device, wherein if the received electrocardiogram matches the template electrocardiogram, then the controlled device is unlocked automatically.

17 Claims, 1 Drawing Sheet

(51) Int. Cl.
*H04W 4/00* (2009.01)
*H04W 76/02* (2009.01)
*H04W 8/00* (2009.01)
*H04W 84/20* (2009.01)

(56) References Cited

U.S. PATENT DOCUMENTS

| | | | | |
|---|---|---|---|---|
| 2002/0068604 A1* | 6/2002 | Prabhakar | ............... | G06F 1/163 455/556.1 |
| 2002/0109595 A1* | 8/2002 | Cairo | ................... | A61B 5/0006 340/573.1 |
| 2005/0253683 A1* | 11/2005 | Lowe | ................... | G06F 21/32 340/5.53 |
| 2006/0197676 A1* | 9/2006 | Smith | ................... | H04N 5/4403 340/10.1 |
| 2007/0131759 A1* | 6/2007 | Cox | ..................... | G06Q 20/341 235/380 |
| 2007/0245158 A1* | 10/2007 | Giobbi | ................... | G06F 21/31 713/186 |
| 2007/0287386 A1* | 12/2007 | Agrawal | ............. | H04W 76/023 455/67.11 |
| 2008/0005575 A1* | 1/2008 | Choyi | ................... | G07C 9/00158 713/182 |
| 2008/0126260 A1* | 5/2008 | Cox | ....................... | G06Q 20/20 705/67 |
| 2008/0146205 A1* | 6/2008 | Aaron | ................. | H04M 3/4228 455/414.2 |
| 2009/0043253 A1* | 2/2009 | Podaima | ................ | G06F 19/322 604/67 |
| 2009/0064296 A1* | 3/2009 | Aikawa | ................... | G06F 21/32 726/6 |
| 2011/0314539 A1* | 12/2011 | Horton | ................... | G06F 21/35 726/20 |
| 2012/0003933 A1* | 1/2012 | Baker | ................. | G06F 19/3412 455/41.2 |
| 2014/0120876 A1* | 5/2014 | Shen | .................. | A61B 5/04525 455/411 |
| 2014/0263648 A1* | 9/2014 | Van Bosch | ............ | G06K 7/087 235/450 |
| 2015/0006904 A1* | 1/2015 | Kimoto | ............... | H04L 63/0861 713/186 |
| 2015/0028996 A1* | 1/2015 | Agrafioti | ................. | G06F 21/40 340/5.82 |
| 2015/0120549 A1* | 4/2015 | Khalid | ............... | G06Q 20/4014 705/44 |
| 2015/0163748 A1* | 6/2015 | Hrabak | ............. | H04W 52/0245 455/41.2 |
| 2016/0225211 A1* | 8/2016 | Gehin | ................ | G07C 9/00309 |

FOREIGN PATENT DOCUMENTS

| | | |
|---|---|---|
| CN | 102231213 A | 11/2011 |
| CN | 202050411 U | 11/2011 |
| CN | 102883050 A | 1/2013 |
| CN | 102883050 A | 1/2013 |
| CN | 102929487 A | 2/2013 |
| CN | 103378876 A | 10/2013 |
| CN | 103581434 A | 2/2014 |
| CN | 103647587 A | 3/2014 |
| CN | 103647587 A | 3/2014 |
| CN | 103686294 A | 3/2014 |
| FR | 2964518 A1 | 3/2012 |
| JP | 2010222841 A | 10/2010 |

* cited by examiner

METHOD FOR ACHIEVING SHORT-DISTANCE UNLOCKING ACCORDING TO THE ELECTROCARDIOGRAM AND SYSTEM THEREOF

FIELD OF THE INVENTION

The present disclosure generally relates to short-distance communication and unlocking technologies, and more particularly, to a method for achieving short-distance unlocking according to the electrocardiogram and a system thereof.

BACKGROUND OF THE INVENTION

As measures to protect the private property security or personal privacy, intelligent lock controlling technologies involving frame locks, door locks and screen locks have become more and more popular and, correspondingly, the unlocking mechanisms also develop continuously. For example, vehicles are unlocked by remote controllers before being started; access control systems are unlocked through fingerprint scanning, human face scanning or by means of radio frequency (RF) cards; and mobile terminals (e.g., mobile phones, or tablet computers) are unlocked through sliding movement on the screen, by inputting a password or by pressing a button.

Some of the conventional unlocking mechanisms require use of corresponding unlocking devices, for example, the remote controllers of vehicles and the RF cards described above. Such unlocking devices need to be carried about and manually operated by the users and do not allow for automatic unlocking. Loss or damage of the unlocking devices will cause inconveniences to the users, and in case the unlocking devices are obtained by others, the properties or securities of the users will be endangered.

Other unlocking mechanisms necessitate human operations, e.g., the fingerprint scanning for the access control systems or the manual unlocking for the mobile terminals. These unlocking mechanisms tend to be disclosed to or cracked by others, so the security level is not high and security of the personal information cannot be guaranteed.

Currently, various wearable devices have found application both in people's lives and at work, and provide diversified applications in respect of health, health care, medical treatment, remote control and so on. This brings about more conveniences to the numerous consumers and improves the living quality of the people. Nowadays, a kind of wearable device that detects the heart rate of a user by means of a built-in sensor according to the pulse rate and plots the electrocardiogram, i.e., the heart-rate wristband, has emerged on the market. It has been found by specialists that, each person has a unique electrocardiogram that is not identical to anybody else. Therefore, using the electrocardiogram as a pattern password will provide a higher security level than those provided by the retinas and fingerprints. According to the medical principles, although the electrocardiogram of a person varies under different conditions, the difference lies only in the amplitude of the electrocardiogram. This kind of heart-rate wristband can keep the amplitude of the electrocardiogram unchanged by scaling the electrocardiogram, so the electrocardiogram output by the heart-beat wristband is unique to the user and cannot be duplicated or simulated and can provide a higher confidential level and security level.

Accordingly, the present disclosure is intended to make an improvement on the conventional unlocking mechanisms by adopting the electrocardiogram.

SUMMARY OF THE INVENTION

In view of the aforesaid shortcomings of the prior art, an objective of the present disclosure is to provide a method for achieving short-distance unlocking according to the electrocardiogram and a system thereof, which can solve the problems that the conventional unlocking mechanisms necessitate manual operations, do not allow for automatic unlocking and the security level thereof is low.

To achieve the aforesaid objective, technical solutions adopted by the present disclosure are as follows.

A method for achieving short-distance unlocking according to an electrocardiogram is provided, which comprises the following steps of:

A. when a paired controlled device is found by a wearable device, determining by the wearable device whether the controlled device and the wearable device are in a short-distance state or a long-distance state therebetween;

B. if the controlled device and the wearable device are in the short-distance state therebetween, then activating a short-distance communication by the wearable device to obtain an electrocardiogram of the user of the wearable device and to wirelessly transmit the electrocardiogram to the paired controlled device; and C. determining by the paired controlled device whether the received electrocardiogram matches a template electrocardiogram stored in the paired controlled device, wherein if the received electrocardiogram matches the template electrocardiogram, then the controlled device is unlocked automatically.

The method for achieving short-distance unlocking according to an electrocardiogram further comprises the following step before the step A:

A0. initially pairing the wearable device and the controlled device with each other, identifying identity (ID) information of each other, and encrypting and saving the identity information of each other; and saving an initial electrocardiogram of the user transmitted by the wearable device and labeling the initial electrocardiogram as the template electrocardiogram by the controlled device.

In the method for achieving short-distance unlocking according to an electrocardiogram, the Bluetooth is adopted to search for whether the paired controlled device is within a first preset range in the step A, which specifically comprises: searching for whether a Bluetooth sensor of the paired controlled device is within the first preset range by a Bluetooth module of the wearable device; wherein if yes, then it is identified that the controlled device and the wearable device are in the short-distance state, and otherwise, it is identified that the controlled device and the wearable device is in the long-distance state.

In the method for achieving short-distance unlocking according to an electrocardiogram, the step A specifically comprises:

A1. transmitting a low-frequency signal by the Bluetooth module of the wearable device to, within a first preset time period, search for whether the Bluetooth sensor of the paired controlled device is within the first preset range, wherein if yes, then it is identified that the controlled device and the wearable device are in the short-distance state, and otherwise, it proceeds to the step A2; and A2. transmitting a high-frequency signal by the Bluetooth module of the wearable device to search for whether the Bluetooth sensor of the paired controlled device is within a second preset range, wherein if yes, then it is identified that the controlled device and the wearable device are in the long-distance state and it returns back to the step A1 immediately, and otherwise, it returns back to the step A1 after expiration of a second preset time period.

In the method for achieving short-distance unlocking according to an electrocardiogram, the Near Field Communication (NFC) is adopted to search for whether the paired controlled device is within a preset range in the step A, which specifically comprises: if an NFC sensor of the paired controlled device is detected by an NFC module of the wearable device, then it is identified that the controlled device and the wearable device are in the short-distance state, and otherwise, it is identified that the controlled device and the wearable device are in the long-distance state.

In the method for achieving short-distance unlocking according to an electrocardiogram, the step C further comprises: if the received electrocardiogram does not match the preset template electrocardiogram, then a manual unlocking mode of the controlled device is activated.

A system for achieving short-distance unlocking according to an electrocardiogram is provided, which comprises a wearable device and a controlled device, wherein the wearable device comprises:
a connection controlling module, being configured to determine, when a paired controlled device is found, whether the controlled device and the wearable device are in a short-distance state or a long-distance state therebetween; and to activate a short-distance communication and wirelessly transmit an electrocardiogram to the paired controlled device if the controlled device and the wearable device are in the short-distance state; and
an electrocardiogram module, being configured to obtain an electrocardiogram of the user of the wearable device if the controlled device and the wearable device are in the short-distance state;

and the controlled device comprises:
a communication module, being configured to receive and transmit the electrocardiogram transmitted by the connection controlling module;
a data processing module, being configured to determine whether the electrocardiogram transmitted by the communication module matches a template electrocardiogram; and
an unlocking controlling module, being configured to accomplish automatic unlocking if the received electrocardiogram matches the template electrocardiogram;

the connection controlling module is connected with the electrocardiogram module, and is wirelessly connected with the communication module, and the communication module, the data processing module and the unlocking controlling module are connected together in sequence.

In the system:
the wearable device further comprises:
an identity matching module, being configured to, when the wearable device and the controlled device initially pair with each other, identify the identity information of the controlled device transmitted by the connection controlling module and encrypt and save the identity information; and
the controlled device further comprises:
an identity verification module, being configured to, when the wearable device and the controlled device initially pair with each other, identify the identity information of the wearable device transmitted by the communication module and encrypt and save the identity information;

the data processing module is further configured to save an initial
electrocardiogram of the user transmitted by the wearable device and label the initial electrocardiogram as the template electrocardiogram; and
the identity matching module is connected with the connection controlling module, and the identity verification module and a storage are both connected with the communication module.

In the system, the connection controlling module of the wearable device is a Bluetooth module, and the communication module of the controlled device is a Bluetooth sensor.

In the system, the connection controlling module of the wearable device is an NFC unit, and the communication module of the controlled device is an NFC sensor.

As compared to the prior art, in the method for achieving short-distance unlocking according to the electrocardiogram and the system thereof according to the present disclosure, the wearable device searches for a paired controlled device, and activates the short-distance communication if it is determined by the wearable device that the controlled device and the wearable device are in the short-distance state therebetween so as to obtain the user's electrocardiogram and wirelessly transmit the electrocardiogram to the paired controlled device; and the controlled device is unlocked automatically if it is determined by the controlled device that the received electrocardiogram matches the template electrocardiogram. Thus, the controlled device can be automatically unlocked without manual operations of the user, and this makes the operation convenient for the user. Moreover, the unique electrocardiogram of the user is used as the key to unlock the controlled device, so the unlocking mechanism is unlikely to be disclosed to or cracked by others, and this greatly improves the security level.

DETAILED DESCRIPTION OF THE INVENTION

The present disclosure provides a method for achieving short-distance unlocking according to the electrocardiogram and a system thereof. To make the objectives, technical solutions and effects of the present disclosure clearer and more definite, the present disclosure will be further detailed with reference to the attached drawings and embodiments hereinafter. It shall be appreciated that, the specific embodiments described herein are only for purpose of illustration rather than limitation.

Figure 1:
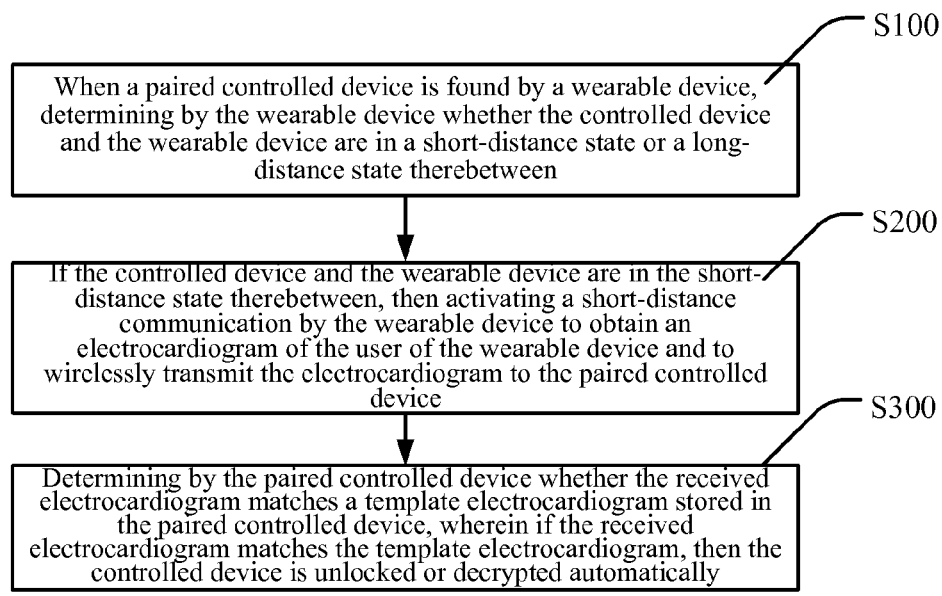
FIG. 1 is a flowchart diagram of a method for achieving short-distance unlocking according to the electrocardiogram in an embodiment of the present disclosure.

The method for achieving short-distance unlocking according to the electrocardiogram of the present disclosure adopts the Near Field Communication (NFC) technology, the electrocardiogram sensing technology, and the image processing technology, and utilizes the electrocardiogram of a user as the unique key to automatically unlock a controlled device when the distance between the user and the controlled device is small. This unlocking mechanism is unlikely to be disclosed to others and greatly improves the security level. Referring to FIG. 1, the method for achieving short-distance unlocking according to the electrocardiogram comprises the following steps of:

S100: when a paired controlled device is found by a wearable device, determining by the wearable device whether the controlled device and the wearable device are in a short-distance state or a long-distance state therebetween;

S200: if the controlled device and the wearable device are in the short-distance state therebetween, then activating a short-distance communication by the wearable device to obtain an electrocardiogram of the user of the wearable device and to wirelessly transmit the electrocardiogram to the paired controlled device; and S300: determining by the paired controlled device whether the received electrocardiogram matches a template electrocardiogram stored in the paired controlled device, wherein if the received electrocardiogram matches the template electrocardiogram, then the controlled device is unlocked automatically.

In this embodiment, the wearable device is usually worn by the user. When the user is close to the controlled device (i.e., the distance between the user and the controlled device is small, e.g., within 1 m), the electrocardiogram of the user can be used as the key to automatically unlock the controlled device.

Many devices in real life need to be locked, so in order to reduce the workload of the wearable device and avoid interferences from other devices, the following steps need to be executed before the step S100 in this embodiment: the wearable device and the controlled device initially pair with each other, identify each other's identity (ID) information and encrypt and save the identity information of each other; and the controlled device saves an initial electrocardiogram of the user transmitted by the wearable device and labels the initial electrocardiogram as the template electrocardiogram. The wearable device can initially pair with several controlled devices. During a searching process, the wearable device automatically screens out the controlled device that has been successfully paired and shields other devices, and this greatly reduces the time and the power consumed in the searching process of the wearable device.

Specifically, during the searching process, the Bluetooth may be adopted by the wearable device to search for whether the paired controlled device is within a first preset range, which specifically comprises: searching for whether a Bluetooth sensor of the paired controlled device is within the first preset range by a Bluetooth module of the wearable device; wherein if yes, then it is identified that the controlled device and the wearable device are in the short-distance state, and otherwise, it is identified that the controlled device and the wearable device are in the long-distance state.

In this embodiment, the searching range of the Bluetooth is less than or equal to 10 m, and it is defined that the distance between the wearable device and the controlled device is a short distance when it is less than 1 m, and a long distance when it is greater than 1 m. The searching process of the Bluetooth specifically comprises:

Step 1: transmitting a low-frequency signal by the Bluetooth module of the wearable device to, within a first preset time period, search for whether the Bluetooth sensor of the paired controlled device is within the first preset range, wherein if there is, then it is identified that the controlled device and the wearable device are in the short-distance state, and otherwise, it proceeds to the step 2; and Step 2: transmitting a high-frequency signal by the Bluetooth module of the wearable device to search for whether the Bluetooth sensor of the paired controlled device is within a second preset range, wherein if yes, then it is identified that the controlled device and the wearable device are in the long-distance state and it returns back to the step 1 immediately, and otherwise, it returns back to the step 1 after expiration of a second preset time period.

The first preset time period is 2 seconds (s); and the first preset range is 0.2 meter (m) to 1 m, or within 1 m. The second preset time period is 5 s; and the second preset range is less than 10 m and greater than 1 m.

When the wearable device is in the standby state, the Bluetooth module firstly searches for whether the paired controlled device is within a distance of 0.2 m to 1 m by transmitting a low-frequency signal (which is at a low power and is capable of propagating within a short distance). If yes, then the distance between the wearable device and the controlled device is small (i.e., the controlled device is within the distance reachable by the user), and the step S200 is executed in the short-distance state to make it convenient for the user to unlock the controlled device.

If no controlled device has been found after 2 s, then the Bluetooth module searches for whether the controlled device is within a range that is less than 10 m and greater than 1 m by transmitting a high-frequency signal (which is at a high power and is capable of propagating within a long distance). If yes, then a certain distance exists between the user (who is wearing the wearable device) and the controlled device and it is identified that the wearable device and the controlled device are in the long-distance state. In this case, the controlled device will not be unlocked, and the user may be approaching or moving away from the controlled device. Thus, the process immediately returns back to the step 1 to continue to determine the distance between the user and the controlled device with the low-frequency signal. If no controlled device has been found in the long-distance state, then the process returns to the step 1 after 5 s to search again with the low-frequency signal. In this embodiment, the searching process is performed with the low-frequency signal alternating with the high-frequency signal, and this can reduce the power of the Bluetooth module and save the signal emissions.

Correspondingly, the wearable device may also adopt the Near Field Communication (NFC) technology to search for whether the paired controlled device is within a preset range. The working distance of the NFC technology is 20 cm, the working frequency thereof is 13.56 MHz, and the transmission speed thereof includes 106 Kbit/s, 212 Kbit/s or 424 Kbit/s. In this case, if an NFC sensor of the paired controlled device is detected by an NFC module of the wearable device, then the distance between the controlled device and the wearable device is less than 20 cm and it is identified that the controlled device and the wearable device are in the short-distance state; and accordingly, the step S200 is executed. If no paired controlled device is detected, then it is identified that the controlled device and the wearable device are in the long-distance state.

If the controlled device and the wearable device are in the short-distance state therebetween, then the wearable device activates the short-distance communication to obtain the user's electrocardiogram and to wirelessly transmit the electrocardiogram to the paired controlled device. If it is determined by the controlled device that the received electrocardiogram matches the template electrocardiogram, then the controlled device is unlocked automatically to enter a main interface and wait for operations of the user; and if the received electrocardiogram does not match the template electrocardiogram, then a manual unlocking mode of the controlled device is activated, and the user needs to manually unlock or input a password to unlock the controlled device.

Figure 2:
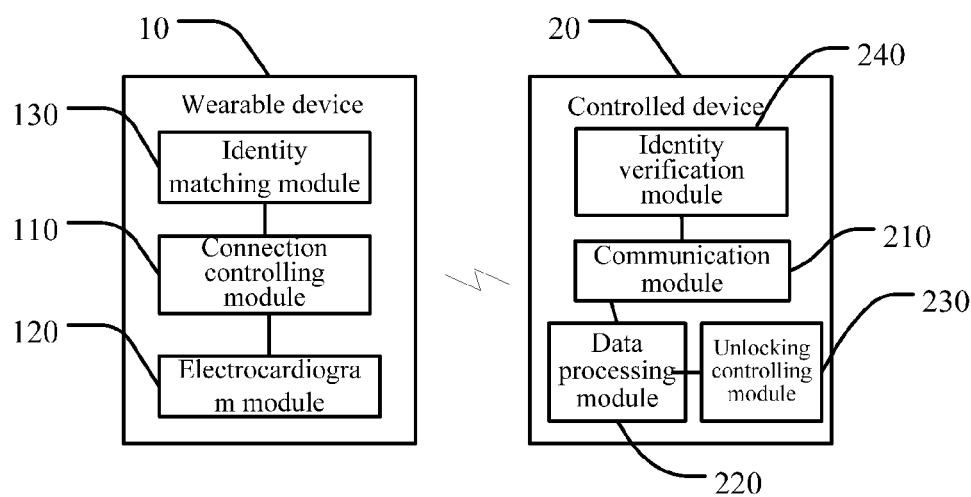
FIG. 2 is a structural block diagram of a system for achieving short-distance unlocking according to the electrocardiogram in an embodiment of the present disclosure.

An embodiment of the present disclosure further provides a system for achieving short-distance unlocking according to the electrocardiogram. Referring to FIG. 2, the system comprises a wearable device 10 and a controlled device 20. The wearable device 10 is worn on the user and is capable of searching for the controlled device 20, obtaining the user's electrocardiogram and transmitting the electrocardiogram to the controlled device. The wearable device 10 may be specifically implemented as a heart-rate wristband. The controlled device is a device that needs to be unlocked, e.g., a frame lock, an access control system or a mobile terminal (e.g., a mobile phone, a tablet computer), etc.

The wearable device 10 comprises a connection controlling module and an electrocardiogram module 120, and the controlled device 20 comprises a communication module 210, a data processing module 220 and an unlocking controlling module 230. The connection controlling module 110 is connected with the electrocardiogram module 120, and is wirelessly connected with the communication module 210, and the communication module 210, the data processing module 220 and the unlocking controlling module 230 are connected together in sequence.

The connection controlling module 110 determines, when the paired controlled device 20 is found, whether the controlled device 20 and the wearable device 10 are in a short-distance state or a long-distance state therebetween. If it is determined that the controlled device 20 and the wearable device 10 are in the short-distance state therebetween, the connection controlling module 110 controls the electrocardiogram module 120 to acquire the user's electrocardiogram and activates the short-distance communication to wirelessly transmit the electrocardiogram to the paired controlled device 20.

The communication module 210 of the controlled device 20 receives the electrocardiogram transmitted by the connection controlling module 110 and transmits the electrocardiogram to the data processing module 220. The data processing module 220 determines whether the electrocardiogram matches a template electrocardiogram and outputs the determination result to the unlocking controlling module 230. The unlocking controlling module 230 accomplished automatic unlocking if the received electrocardiogram matches the template electrocardiogram, and activates the manual unlocking mode if the received electrocardiogram does not match the template electrocardiogram.

To reduce the workload of the wearable device and shield interferences from other devices, the wearable device 10 further comprises an identity matching module 130, and the controlled device 20 further comprises an identity verification module 240. The identity matching module 130 is connected with the connection controlling module 110, and the identity verification module and a storage are both connected with the communication module 210. The identity matching module 130 identifies the identity information of the controlled device 20 transmitted by the connection controlling module 110 and encrypts and saves the identity information when the wearable device 10 and the controlled device 20 initially pair with each other. The identity verification module 240 identifies the identity information of the wearable device 10 transmitted by the communication module 210 and encrypts and saves the identity information when the wearable device 10 and the controlled device 20 initially pair with each other. The data processing module 220 further saves an initial electrocardiogram of the user transmitted by the wearable device and labels the initial electrocardiogram as the template electrocardiogram.

In practical implementations, the connection controlling module 110 of the wearable device 10 may adopt the Bluetooth technology, in which case the connection controlling module 110 is a Bluetooth module and correspondingly, the communication module 210 of the controlled device is a Bluetooth sensor. Reference may be made to the aforesaid embodiments for the working principles of the Bluetooth module and the Bluetooth sensor, and this will not be further described herein.

Correspondingly, the connection controlling module 110 of the wearable device 10 may also adopt the NFC technology, in which case the connection controlling module 110 is an NFC unit and the communication module of the controlled device is an NFC sensor. Reference may be made to the aforesaid embodiments for the working principles of the NFC unit and the NFC sensor work, and this will not be further described herein.

According to the above descriptions, the wearable device according to the present disclosure searches for a paired controlled device and activates the short-distance communication if it is determined that the controlled device and the wearable device are in the short-distance state so as to obtain the user's electrocardiogram and wirelessly transmit the electrocardiogram to the controlled device; and the controlled device is unlocked automatically if it is determined by the controlled device that the received electrocardiogram matches the template electrocardiogram. Thus, the controlled device can be automatically unlocked without manual operations of the user, and this makes the operation convenient for the user. Moreover, the unique electrocardiogram of the user is used as the key to unlock the controlled device, so the unlocking mechanism is unlikely to be disclosed to or cracked by others, and this greatly improves the security level.

Furthermore, it is apparent to those skilled in the art, the present disclosure also provides a terminal device, which comprises a non-transitory program storage medium and a processor. The non-transitory program storage medium stores a program executed by the processor to perform the method as described in above. Furthermore, it is apparent to those skilled in the art that, the connection controlling module 110, the electrocardiogram module 120, the identity matching module 130 of the wearable device 10, and the communication module 210, the data processing module 220, the unlocking controlling module 230 and the identity verification module 240 of the controlled device as shown in FIG. 2 are software modules. In another aspect, it is well-known that various software modules inherently are stored in the non-transitory program storage medium and executed by the processor to perform the related functions respectively.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A method for achieving short-distance unlocking according to an electrocardiogram, comprising the following steps of:
   A. when a paired controlled device is found by a wearable device, determining by the wearable device whether the controlled device and the wearable device are in a short-distance state or a long-distance state therebetween;

B. if the controlled device and the wearable device are in the short-distance state therebetween, then activating a short-distance communication by the wearable device to obtain an electrocardiogram of the user of the wearable device and to wirelessly transmit the electrocardiogram to the paired controlled device; and C. determining by the paired controlled device whether the received electrocardiogram matches a template electrocardiogram stored in the paired controlled device, wherein if the received electrocardiogram matches the template electrocardiogram, then the controlled device is unlocked automatically;

wherein the step A specifically comprises:

A1. transmitting a low-frequency signal by the wearable device to, within a first preset time period, search for whether the controlled device is within a first preset range, wherein if yes, then it is identified that the controlled device and the wearable are in the short-distance state, and otherwise, it proceeds to a following step A2; and A2. transmitting a high-frequency signal by the wearable device to, within a second preset time period, search for whether the controlled device is within a second preset range, wherein if yes, then it is identified that the controlled device and the wearable device is in the long-distance state and it returns back to the step A1 immediately; and otherwise, it returns back to the step A1 after expiration of the second preset time period;

wherein the first preset range is smaller than the second preset range, and the first preset time period is smaller than the second preset time period.

2. The method for achieving short-distance unlocking according to an electrocardiogram of claim 1, further comprising the following step before the step A:

A0. initially pairing the wearable device and the controlled device with each other, identifying identity (ID) information of each other, and encrypting and saving the identity information of each other; and saving an initial electrocardiogram of the user transmitted by the wearable device and labeling the initial electrocardiogram as the template electrocardiogram by the controlled device.

3. The method for achieving short-distance unlocking according to an electrocardiogram of claim 2, wherein during later searching processes after initially pairing the wearable device and the controlled device with each other, the wearable device automatically screens out the controlled device that has been successfully paired and shields other devices.

4. The method for achieving short-distance unlocking according to an electrocardiogram of claim 1, wherein in the step A, the Bluetooth is adopted to search for whether the paired controlled device is within a first preset range, which specifically comprises: searching for whether a Bluetooth sensor of the paired controlled device is within the first preset range by a Bluetooth module of the wearable device; wherein if yes, then it is identified that the controlled device and the wearable device are in the short-distance state, and otherwise, it is identified that the controlled device and the wearable device are in the long-distance state.

5. The method for achieving short-distance unlocking according to an electrocardiogram of claim 1, wherein in the step A, the Near Field Communication (NFC) is adopted to search for whether the paired controlled device is within a preset range, which specifically comprises: if an NFC sensor of the paired controlled device is detected by an NFC module of the wearable device, then it is identified that the controlled device and the wearable device are in the short-distance state, and otherwise, it is identified that the controlled device and the wearable device are in the long-distance state.

6. The method for achieving short-distance unlocking according to an electrocardiogram of claim 1, wherein the step C further comprises: if the received electrocardiogram does not match the preset template electrocardiogram, then a manual unlocking mode of the controlled device is activated.

7. The method for achieving short-distance unlocking according to an electrocardiogram of claim 1, wherein the first preset time period is 2 seconds, the first preset range is 0.2 meter to 1 meter, or within 1 meter; the second present time period is 5 seconds, and the second preset range is less than 10 meters and greater than 1 meter.

8. The method for achieving short-distance unlocking according to an electrocardiogram of claim 1, wherein the Bluetooth module of the wearable device uses the low-frequency signal and the high-frequency signal alternately to search.

9. The method for achieving short-distance unlocking according to an electrocardiogram of claim 1, wherein the wearable device is a heart-rate wristband.

10. A method for achieving short-distance unlocking according to an electrocardiogram, comprising the following steps of:

A0. initially pairing a wearable device and a controlled device with each other, identifying identity (ID) information of each other and encrypting and saving the identity information of each other; and saving an initial electrocardiogram of the user transmitted by the wearable device and labeling the initial electrocardiogram as the template electrocardiogram by the controlled device; wherein during later searching processes after initially pairing the wearable device and the controlled device with each other, the wearable device automatically screens out the controlled device that has been successfully paired and shields other devices;

A. when the paired controlled device is found by the wearable device, determining by the wearable device whether the controlled device and the wearable device are in a short-distance state or a long-distance state therebetween;

B. if the controlled device and the wearable device are in the short-distance state therebetween, then activating a short-distance communication by the wearable device to obtain an electrocardiogram of the user of the wearable device and to wirelessly transmit the electrocardiogram to the paired controlled device; and C. determining by the paired controlled device whether the received electrocardiogram matches the template electrocardiogram stored in the paired controlled device, wherein if the received electrocardiogram matches the template electrocardiogram, then the controlled device is unlocked automatically;

wherein the step C further comprises: if the received electrocardiogram does not match the preset template electrocardiogram, then a manual unlocking mode of the controlled device is activated;

wherein the step A specifically comprises:

A1. transmitting a low-frequency signal by the wearable device to, within a first preset time period, search for whether the controlled device is within a first preset range, wherein if yes, then it is identified that the controlled device and the wearable are in the short-distance state, and otherwise, it proceeds to a following step A2; and A2. transmitting a high-frequency signal by the wearable device to, within a second preset time period, search for whether the controlled device is within a second preset range, wherein if yes, then it is identified that the controlled device and the wearable device is in the long-distance state and it returns back to the step A1 immediately; and otherwise, it returns back to the step A1 after expiration of the second preset time period;

wherein the first preset range is smaller than the second preset range, and the first preset time period is smaller than the second preset time period.

11. The method for achieving short-distance unlocking according to an electrocardiogram of claim 10, wherein in the step A, the Bluetooth is adopted to search for whether the paired controlled device is within a first preset range, which specifically comprises: searching for whether a Bluetooth sensor of the paired controlled device is within the first preset range by a Bluetooth module of the wearable device; wherein if yes, then it is identified that the controlled device and the wearable device are in the short-distance state, and otherwise, it is identified that the controlled device and the wearable device are in the long-distance state.

12. The method for achieving short-distance unlocking according to an electrocardiogram of claim 10, wherein in the step A, the Near Field Communication (NFC) is adopted to search for whether the paired controlled device is within a preset range, which specifically comprises: if an NFC sensor of the paired controlled device is detected by an NFC module of the wearable device, then it is identified that the controlled device and the wearable device are in the short-distance state, and otherwise, it is identified that the controlled device and the wearable device are in the long-distance state.

13. The method for achieving short-distance unlocking according to an electrocardiogram of claim 10, wherein the first preset time period is 2 seconds; the first preset range is 0.2 meter to 1 meter, or within 1 meter; the second preset time period is 5 seconds; and the second preset range is less than 10 meters and greater than 1 meter.

14. A system for achieving short-distance unlocking according to an electrocardiogram, comprising a wearable device and a controlled device, wherein the wearable device comprises:
a connection controlling module, being configured to determine, when a paired controlled device is found, whether the controlled device and the wearable device are in a short-distance state or a long-distance state therebetween; and to activate a short-distance communication and wirelessly transmit an electrocardiogram to the paired controlled device if the controlled device and the wearable device are in the short-distance state, wherein the connection controlling module is further configured to perform following steps which comprises: A1. transmitting a low-frequency signal by the wearable device to, within a first preset time period, search for whether the controlled device is within a first preset range, wherein if yes, then it is identified that the controlled device and the wearable are in the short-distance state, and otherwise, it proceeds to a following step A2; and A2. transmitting a high-frequency signal by the wearable device to, within a second preset time period, search for whether the controlled device is within a second preset range, wherein if yes, then it is identified that the controlled device and the wearable device is in the long-distance state and it returns back to the step A1 immediately; and otherwise, it returns back to the step A1 after expiration of the second preset time period; wherein the first preset range is smaller than the second preset range, and the first preset time period is smaller than the second preset time period; and an electrocardiogram module, being configured to obtain an electrocardiogram of the user of the wearable device if the controlled device and the wearable device are in the short-distance state;

and the controlled device comprises:
a communication module, being configured to receive and transmit the electrocardiogram transmitted by the connection controlling module;

a data processing module, being configured to determine whether the electrocardiogram transmitted by the communication module matches a template electrocardiogram; and an unlocking controlling module, being configured to accomplish automatic unlocking if the received electrocardiogram matches the template electrocardiogram;

wherein the connection controlling module is connected with the electrocardiogram module, and is wirelessly connected with the communication module, and the communication module, the data processing module and the unlocking controlling module are connected together in sequence.

15. The system of claim 14, wherein:
the wearable device further comprises:
an identity matching module, being configured to, when the wearable device and the controlled device initially pair with each other, identify the identity information of the controlled device transmitted by the connection controlling module and encrypt and save the identity information; and the controlled device further comprises:
an identity verification module, being configured to, when the wearable device and the controlled device initially pair with each other, identify the identity information of the wearable device transmitted by the communication module and encrypt and save the identity information;

the data processing module is further configured to save an initial electrocardiogram of the user transmitted by the wearable device and label the initial electrocardiogram as the template electrocardiogram; and the identity matching module is connected with the connection controlling module, and the identity verification module and a storage are both connected with the communication module.

16. The system of claim 14, wherein the connection controlling module of the wearable device is a Bluetooth module, and the communication module of the controlled device is a Bluetooth sensor.

17. The system of claim 14, wherein the connection controlling module of the wearable device is an NFC unit, and the communication module of the controlled device is an NFC sensor.

* * * * *